C. W. RAMEY.
LOG GRAPPLE.
APPLICATION FILED JUNE 26, 1911.
1,032,083.
Patented July 9, 1912.
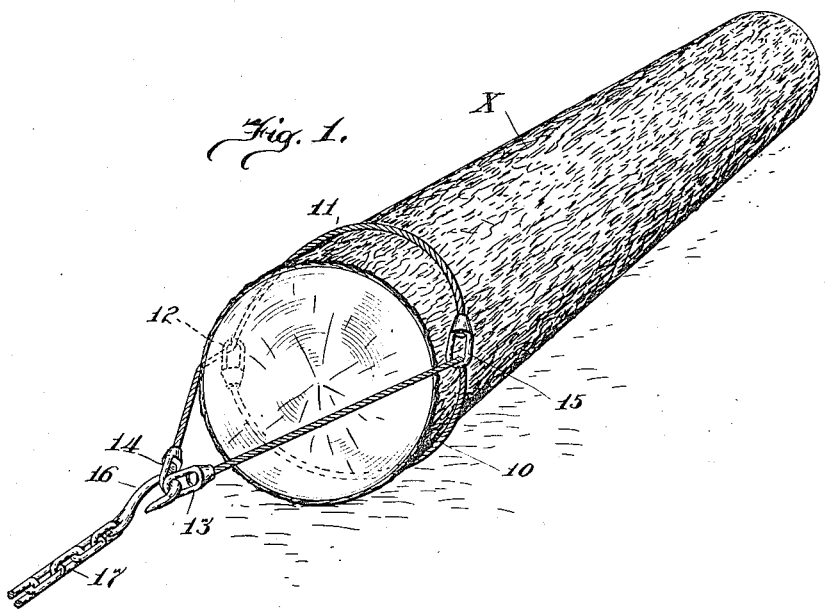
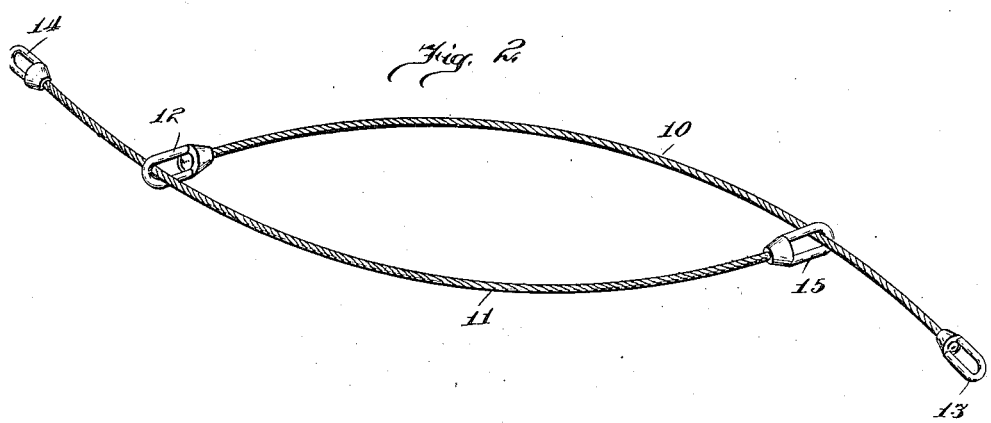
Witnesses
Multon Lenoir
Marie Tapy
Inventor
Charles W. Ramey
By Gleeson & Gleeson
Attorneys.

UNITED STATES PATENT OFFICE.

CHARLES W. RAMEY, OF BURDETTE, ARKANSAS.

LOG-GRAPPLE.

1,032,083.

Specification of Letters Patent.

Patented July 9, 1912.

Application filed June 26, 1911. Serial No. 635,499.

*To all whom it may concern:*

Be it known that I, CHARLES W. RAMEY, a citizen of the United States, and resident of Burdette, county of Mississippi, and State of Arkansas, have invented certain new and useful Improvements in Log-Grapples, of which the following is a specification, and which are illustrated in the accompanying drawings, forming a part thereof.

The invention relates to devices by which a hauling chain or cable may be attached to a log for drawing it over the ground.

The objects of the invention are to secure a high degree of efficiency coupled with simplicity of construction and ease of manipulation; these objects will be more fully pointed out in connection with the following description of the improved device.

In the accompanying drawings—Figure 1 is a perspective of the device as applied to a log, and Fig. 2 is a view of the device detached from the log.

The improved grappler is formed of two sections 10, 11, of cable or other material having ample tensile strength, the two sections being of uniform length. To the end of each section there is securely attached a metallic loop 12, 13 and 14, 15, each of the sections 10, 11 being passed through one of the loops of the other section. Preferably the loops are made oblong, as shown, in order that the two sections may be connected and disconnected at pleasure after the loops have been attached. It is obvious that for this purpose, but one loop of each section need be of such shape and size as to permit one of the loops of the other section to pass through it, but by making the loops of uniform shape and size, as shown, the sections may be much more conveniently assembled. When the two sections are united, as shown in Fig. 2, they form a loop for receiving the end of the log X, as shown in Fig. 1. The loops 13, 14 being brought together across the end of the log are engaged with a hook 16 on the end of the hauling chain 17.

The device may be used on logs of any size within the range of its maximum capacity. The line of draft is directly in line with the axis of the log thereby requiring much less power to haul the log than is necessary when the draft is applied at one side. The grip upon the log is directly proportioned to the weight of the latter and in all cases is sufficient to prevent slippage.

The device is easily applied to the log and is as easily loosened therefrom. The log will always be in such position that, at least, one of the loops 12, 15 will be accessible.

I claim as my invention—

A log grapple comprising, in combination, two equal independent flexible sections each having a loop at one end and each section being slidingly engaged with the said loop of the other section intermediate its ends, the parts of the two sections between their respective loops and the said point of engagement of each with the loop of the other section being oppositely bowed to form a contractile band for encircling and gripping a log and the free ends of the sections being extended away from the plane of the band for attachment to a hauling cable.

CHARLES W. RAMEY.

Witnesses:
M. COOPER,
C. R. LAYMAN.